United States Patent
Svoboda, Jr.

(10) Patent No.: US 7,334,755 B2
(45) Date of Patent: Feb. 26, 2008

(54) TANDEM ROTOR WING AND TANDEM FIXED WING AIRCRAFT

(75) Inventor: Charles R. Svoboda, Jr., University City, MO (US)

(73) Assignee: The Boeing Company, Chicago, IL (US)

(*) Notice: Subject to any disclaimer, the term of this patent is extended or adjusted under 35 U.S.C. 154(b) by 36 days.

(21) Appl. No.: 11/136,825

(22) Filed: May 25, 2005

(65) Prior Publication Data

US 2006/0266879 A1 Nov. 30, 2006

(51) Int. Cl.
*B64C 27/08* (2006.01)

(52) U.S. Cl. .................................... 244/17.23

(58) Field of Classification Search ............... 244/7 C, 244/17.21, 17.23, 6, 17.11, 7 R; D12/326–329
See application file for complete search history.

(56) References Cited

U.S. PATENT DOCUMENTS

| | | | | |
|---|---|---|---|---|
| 2,414,435 A | * | 1/1947 | Bendix | 416/24 |
| 2,625,997 A | * | 1/1953 | Doak | 416/23 |
| D184,501 S | * | 2/1959 | Wlaschin et al. | D12/4 |
| D187,963 S | * | 5/1960 | Apostolescu | D12/329 |
| 2,959,373 A | * | 11/1960 | Zuck | 244/7 C |
| 3,483,696 A | * | 12/1969 | Gilbert et al. | 60/792 |
| 4,793,572 A | * | 12/1988 | Mecca | 244/7 R |
| 5,454,530 A | | 10/1995 | Rutherford et al. | |
| 6,789,764 B2 | | 9/2004 | Bass et al. | |
| 2004/0056144 A1 | * | 3/2004 | Bass et al. | 244/10 |

* cited by examiner

*Primary Examiner*—Tien Dinh
(74) *Attorney, Agent, or Firm*—Lee & Hayes, PLLC (57) ABSTRACT

Aircraft comprising an airframe having a fuselage, at least two fixed wing sets. A first fixed wing set of the fixed wing sets is positioned closer to a forward end of the fuselage than a second fixed wing set and the second fixed wing set is positioned closer to the aft end of the fuselage than the first fixed wing set. The aircraft includes a power plant mounted on the airframe and at least two rotor wings rotatably mounted on the airframe. Each rotor wing has a plurality of blades extending outward from a central hub to blade tips. The blade tips of the rotor wings circumscribe respective circles centered on the corresponding central hubs during rotation of the rotor wings and each fixed wing set is located generally below the circumscribed circle of only one of the rotor wings. The aircraft includes a rotation mode and a fixed mode.

8 Claims, 7 Drawing Sheets

TANDEM ROTOR WING AND TANDEM FIXED WING AIRCRAFT

BACKGROUND OF THE INVENTION

The present invention relates to aircraft capable of vertical and short take-off and landing and, more particularly, to aircraft capable of such flight through the use of fixed wing sets and rotor wings that can be selectively stopped to act as fixed wings.

Aircraft designed to allow vertical and short take-off and landing, hovering, full forward flight, and transitional flight have existed since about the middle of the twentieth century. These vehicles are often referred to as dual mode or V/STOL aircraft because of their vertical and/or short take-off and landing capabilities. Traditional V/STOL aircraft have been designed to carry relatively small payloads. Reliably carrying large loads, such as loads weighing more than about 2 tons, using V/STOL aircraft has traditionally been problematic due to vertical thrust and aircraft control limitations.

One method of providing vertical thrust to an aircraft is by using a single rotor wing mounted atop the aircraft. A rotor wing is a structure that can be selectively used as a rotor and as a fixed wing. To increase vertical thrust characteristics for accommodating heavier loads, some V/STOL aircraft designs include a second rotor wing atop the aircraft. Even with two rotor wings, however, transitioning from vertical flight to forward flight while carrying heavy loads can prove problematic due to insufficient pitch control. A fixed wing set located about halfway along the length of the fuselage, i.e., in the region of a cargo bay, may provide lift and some pitch control, but it does not contribute enough pitch control for tandem rotor wing aircraft to simultaneously slow and stop both rotor wings while carrying a heavy load. Thus, when transitioning from vertical to forward flight, the rotor wings of tandem rotor heavy lift aircraft cannot be stopped simultaneously because one rotor is needed to provide pitch control while the other rotor is being stopped.

Another problem of traditional tandem rotor wing aircraft is a tendency for the blades of overlapping rotor wings to contact. The blade contact problem is often increased for heavy lift aircraft because the increased forces encountered by the blades cause the blades of the respective rotor wings to deflect by larger amounts from designated planes of rotation and into the paths of each other.

BRIEF SUMMARY OF THE INVENTION

The present invention relates to aircraft comprising an airframe having a fuselage extending longitudinally between a forward end and an aft end opposite the forward end. The aircraft further includes at least two fixed wing sets extending laterally from the fuselage wherein a first fixed wing set of the fixed wing sets is positioned closer to the forward end of the fuselage than a second fixed wing set of the fixed wing sets and the second fixed wing set is positioned closer to the aft end of the fuselage than the first fixed wing set. In addition, the aircraft includes a power plant mounted on the airframe and at least two rotor wings rotatably mounted on the airframe. Each rotor wing has a plurality of blades extending outward from a central hub to blade tips. The blade tips of the rotor wings circumscribe respective circles centered on the corresponding central hubs during rotation of the rotor wings and each fixed wing set is located generally below the circumscribed circle of only one of the rotor wings. Also, the aircraft includes a rotation mode in which at least one of the rotor wings is rotated by the power plant and a fixed mode in which the rotor wings are locked to prevent rotation thereof.

In another aspect, the present invention includes an airframe having a fuselage extending longitudinally between a forward end and an aft end opposite the forward end. The aircraft further includes at least two fixed wing sets extending laterally from the fuselage and a power plant mounted on the airframe. In addition, the aircraft includes at least two rotor wings rotatably mounted on the airframe. A first rotor wing of the rotor wings is mounted on the airframe at a first longitudinal position of the fuselage closer to the forward end of the fuselage than a second rotor wing of the rotor wings. A first fixed wing set of the fixed wing sets is positioned adjacent the first longitudinal position and a second fixed wing set of the fixed wing sets is positioned adjacent the second longitudinal position.

In yet another aspect, the present invention includes a method of flying an aircraft having a fuselage, at least two fixed wing sets extending laterally from the fuselage, and at least two rotor wings rotatably mounted on the fuselage. The method comprises selectively providing pitch stability to the aircraft using the fixed wing sets and selectively providing upward thrust to the aircraft using at least one of the rotor wings. The method further comprises actively controlling rotation speed of at least one of the rotor wings when both rotor wings are rotating to avoid contact between blades of the respective rotor wings.

Other aspects of the present invention will be in part apparent and in part pointed out hereinafter.

BRIEF DESCRIPTION OF THE DRAWINGS

Corresponding reference characters indicate corresponding parts throughout the several views of the drawings.

DETAILED DESCRIPTION OF THE INVENTION

The present invention relates to aircraft, and more particularly to heavy lift vertical and short take-off aircraft having at least two rotor wings and at least two fixed wing sets. Referring now to the figures, and more particularly to FIG. 1, an aircraft according to a first embodiment of the present invention is designated in its entirety by reference number 10. The aircraft 10 has an airframe 12 including a fuselage 14 extending longitudinally and two fixed wing sets 16, 18 extending laterally from the fuselage. Although two fixed wing sets 16, 18 are shown, the airframe 12 can include more than two fixed wing sets without departing from the scope of the present invention. Although the fixed wing sets 16, 18 may have other wingspans without departing from the scope of the present invention, in one embodiment one of the fixed wing sets 16 has a wingspan extending between wingtips 20 of between about 40 feet and about 50 feet and the other fixed wing set 18 has a wingspan extending between wingtips 22 of between about 40 feet and about 50 feet. The fuselage 14 extends between a forward end 24 and an aft end 26. Although the fuselage 14 may have other lengths without departing from the scope of the present invention, in one embodiment the fuselage has a length extending between the forward end 24 and the aft end 26 of between about 60 feet and about 70 feet.

Figure 1:
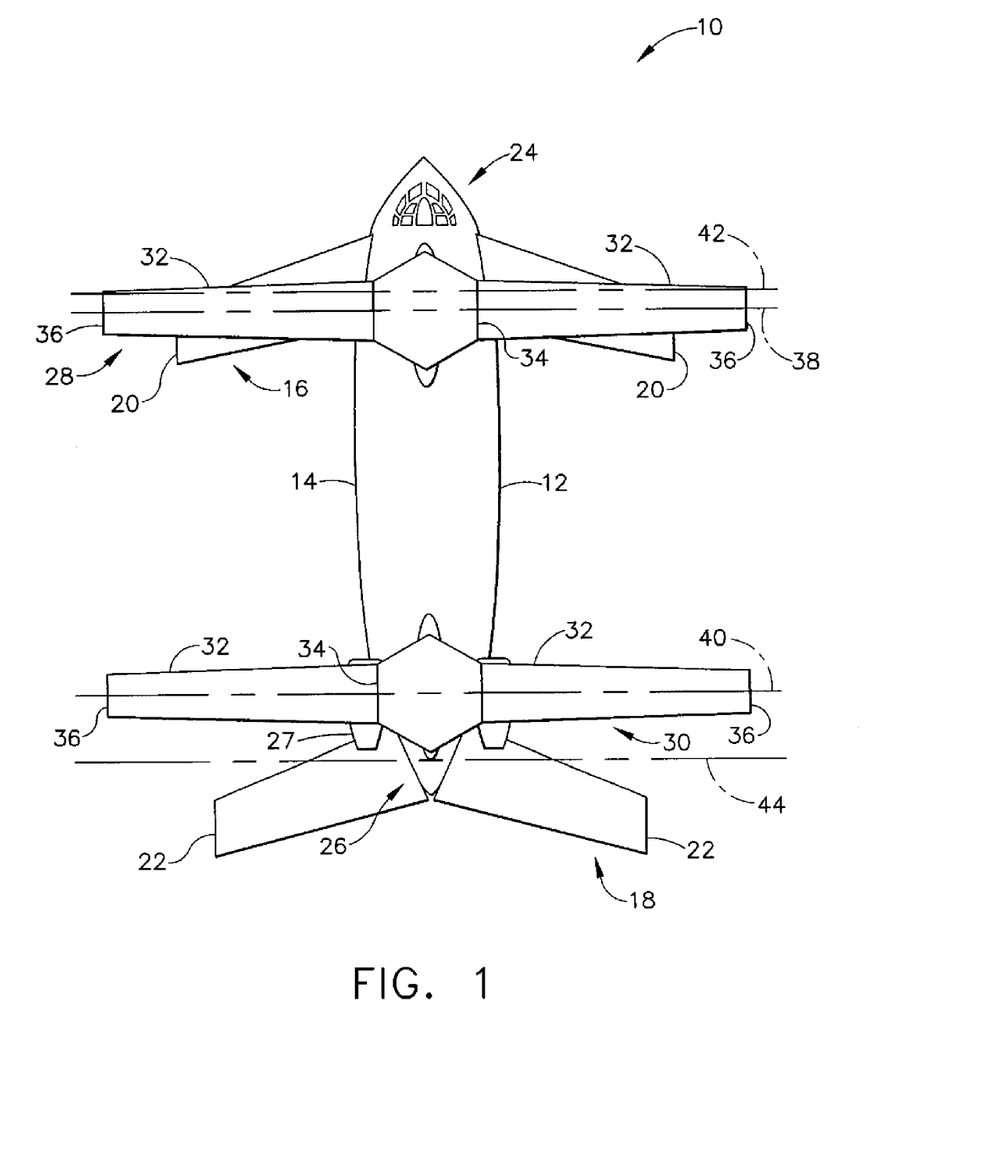
FIG. 1 is a top plan of an aircraft according to a first embodiment of the present invention.

The aircraft 10 further includes at least one conventional power plant 27 (e.g., a gas turbine engine) mounted on the airframe 12 and two rotor wings 28, 30 rotatably mounted on the airframe. The rotor wings 28, 30 rotate to provide upward thrust to the aircraft 10. Each rotor wing 28, 30 includes two or more blades 32 extending outward from a central hub 34 to blade tips 36. Although the rotor wings 28, 30 may have other wingspans without departing from the scope of the present invention, in one embodiment one rotor wing 28 has a wingspan extending between the blade tips 36 of between about 40 feet and about 50 feet and the other rotor wing 30 has a wingspan extending between the blade tips 36 of between about 40 feet and about 50 feet. Although two rotor wings 28, 30 are shown, the aircraft 10 may have more than two rotor wings without departing from the scope of the present invention. The rotor wings 28, 30 are rotatably mounted on the airframe at respective longitudinal positions 38, 40. The longitudinal positions 38, 40 of the rotor wings are defined by the intersection of the fuselage and the center of rotation of the respective wing. The fixed wing sets 16, 18 are mounted on the aircraft 10 at respective longitudinal positions 42, 44. The longitudinal positions 42, 44 of the fixed wing sets are defined by the intersection of the fuselage and the midpoint of the chord of the respective wing. The first fixed wing set 16 is positioned adjacent the first longitudinal position 38 and the second fixed wing set 18 is positioned adjacent the second longitudinal position. In one embodiment, the longitudinal position 42 of the first fixed wing set 16 is in front of the longitudinal position 38 of the first rotor wing 28 and the longitudinal position 44 of the second fixed wing set 18 is behind the longitudinal position 40 of the second rotor wing 30, as shown in FIG. 1. In other embodiments, the longitudinal position 42 of the first fixed wing set 16 can be colinear with or behind the longitudinal position 38 of the first rotor wing 28 and the longitudinal position 44 of the second fixed wing set 18 can be colinear with or in front of the longitudinal position 40 of the second rotor wing 30.

Figure 2:
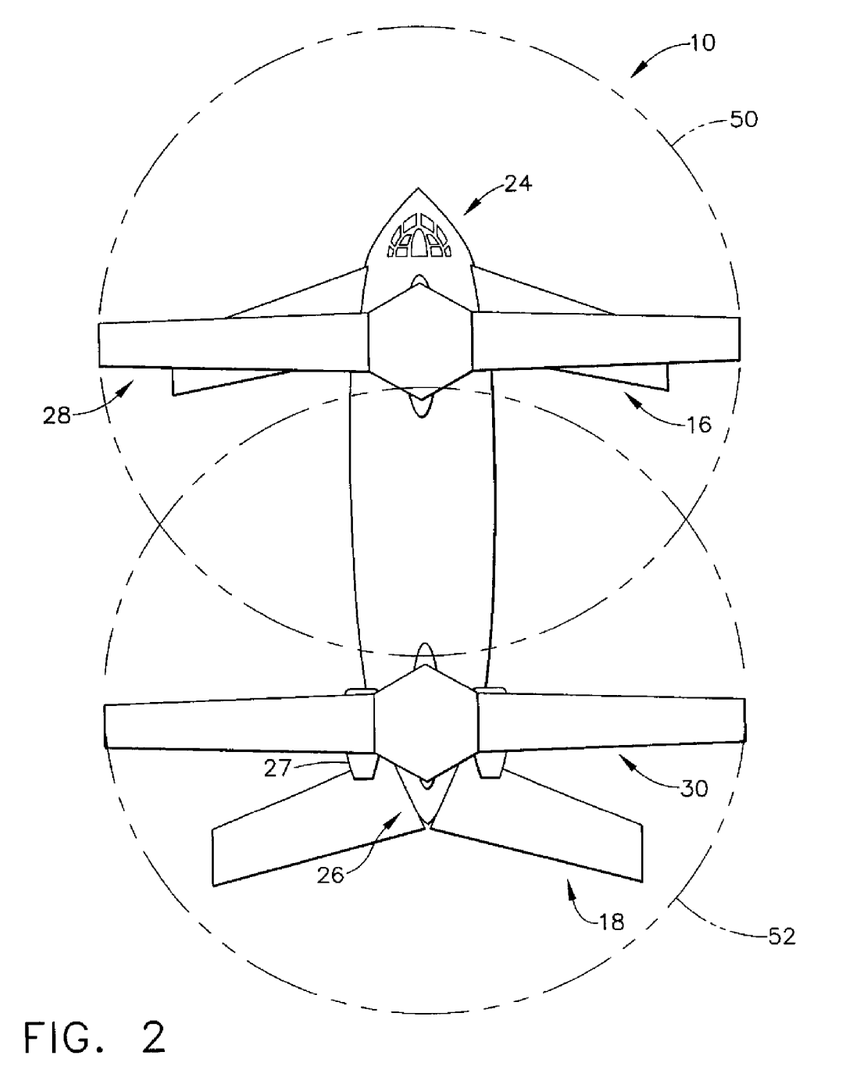
FIG. 2 is a top plan of the aircraft of the first embodiment showing rotor wing rotation paths.

The aircraft 12 has a rotation mode in which at least one of the rotor wings 28, 30 is rotated by the power plant 27 and a fixed mode in which the rotor wings are locked to prevent rotation thereof. In one embodiment, each rotor wing has two blades that generally extend laterally from the aircraft when the rotor wing is in the fixed mode. In one embodiment (not shown) the two blades of each rotor wing are oblique with respect to each other to delay onset of wave drag. The rotor wings 28, 30 can be rotated by the power plant 27 in a variety of ways. In one embodiment, the power plant 27 sends high pressure gas to the rotor wings 28, 30. The gas sent from the power plant 27 to each rotor wing 28, 30 is then channeled out of the respective rotor wing blade tip 36 in a direction providing rotational thrust to the respective rotor wing. In another embodiment, the power plant 27 is mechanically linked to each rotor wing 28, 30. For example, the power plant 27 can be connected to the rotor wings 28, 30 by way of shafts and gear boxes (not shown) that transfer torque from the power plant to the rotor wings. When both rotor wings are rotating, the aircraft 10 is in full rotation mode and when at least one rotor wing 28, 30 is rotated and at least one rotor wing is locked, the aircraft is in partial rotation mode. When the rotor wings 28, 30 rotate, the corresponding blade tips 36 circumscribe circles 50, 52 centered about the corresponding central hub 34, as shown in FIG. 2. Rotor wings 28, 30 whose circumscribed circles 50, 52 overlap when viewed from above are said to be overlapping, even if they rotate in different horizontal planes (shown in FIG. 3). The first fixed wing set 16 can be positioned generally below or directly and completely below the circle 50 circumscribed by the first rotor wing 28 but not positioned directly below the circle 52 circumscribed by the second rotor wing 30. The second fixed wing set 18 is positioned generally below or directly and completely below the circle 52 circumscribed by the second rotor wing 30 but not directly below the circle 50 circumscribed by the first rotor wing 28.

When the aircraft 10 is flying in the fixed mode, the locked rotor wings 28, 30 provide aerodynamic lift to the aircraft by acting as conventional airplane wings, whereby a low pressure area is created above the blades 32 and a high pressure area is created below the blades to provide lift to the aircraft 10. During the rotation modes when only one rotor wing 28, 30 is rotating and the other rotor wing 30, 28 is locked, the rotating rotor wing 28, 30 provides upward thrust and pitch control and, to the extent the aircraft is traveling forward, the locked rotor wing 30, 28 provides additional aerodynamic lift and pitch control to the aircraft 10.

Having a fixed wing set 16, 18 adjacent the front end 24 and the aft end 26 of the fuselage 12 provides improved pitch stability compared to planes having only one fixed wing set or two positioned in other ways. Improved pitch control allows for better maneuvering during flight, especially during transitional flight between full rotation mode and partial rotation or fixed mode. For example, traditional tandem rotor wing aircraft generally can only transition from full rotation mode to fixed mode by going through the partial rotation mode, in which one rotor wing is locked but the other is rotating. That is, traditional tandem rotor wing aircraft generally must sequentially lock the rotor wings 28, 30 because when the rotor wings of conventional aircraft carrying a heavy and/or uneven load are stopped simultaneously, the aircraft will generally not have sufficient pitch control. When rotor wings are locked sequentially, the second rotor wing to be locked provides needed pitch stability to the aircraft while the first rotor wing to be locked is slowed and stopped. The first locked rotor wing provides pitch stability while the second rotor wing to be locked is slowed and stopped. On the other hand, the tandem rotor wing aircraft 10 according to the present invention can transition directly from full rotation mode to fixed mode by simultaneously slowing and locking both rotor wings 28, 30 because the fixed wing sets 16, 18 ensure the aircraft has sufficient pitch control at all times. For example, as the rotor wings 28, 30 are simultaneously slowed and locked, when the aircraft has a sufficient amount of forward speed, the fixed wing sets 16, 18 provide enough aerodynamic lift and pitch control to stabilize the pitch of the aircraft 10, even during heavy load transport.

The need for reliable pitch control is increased when the aircraft 10 carries heavy payload or has uneven weight distributions. For example, military aircraft may have heavy machinery, such as tanks, loaded into the fuselage by way of a loading ramp 54 (shown in FIG. 3). When heavy loads are unevenly distributed, the effective center of gravity of the aircraft 10 is displaced, which changes the pitch control requirements of the aircraft. The pitch control provided by the fixed wing sets 16, 18 and rotor wings 28, 30 as described allows the aircraft 10 of the present invention to reliably accommodate heavy and uneven loading. In some applications, it is very important to be able to be able to accommodate a large range of effective centers of gravity. For example, in military applications where quick loading is needed, the speed of loading can be increased when precise cargo placement during loading is not required.

Figure 3:
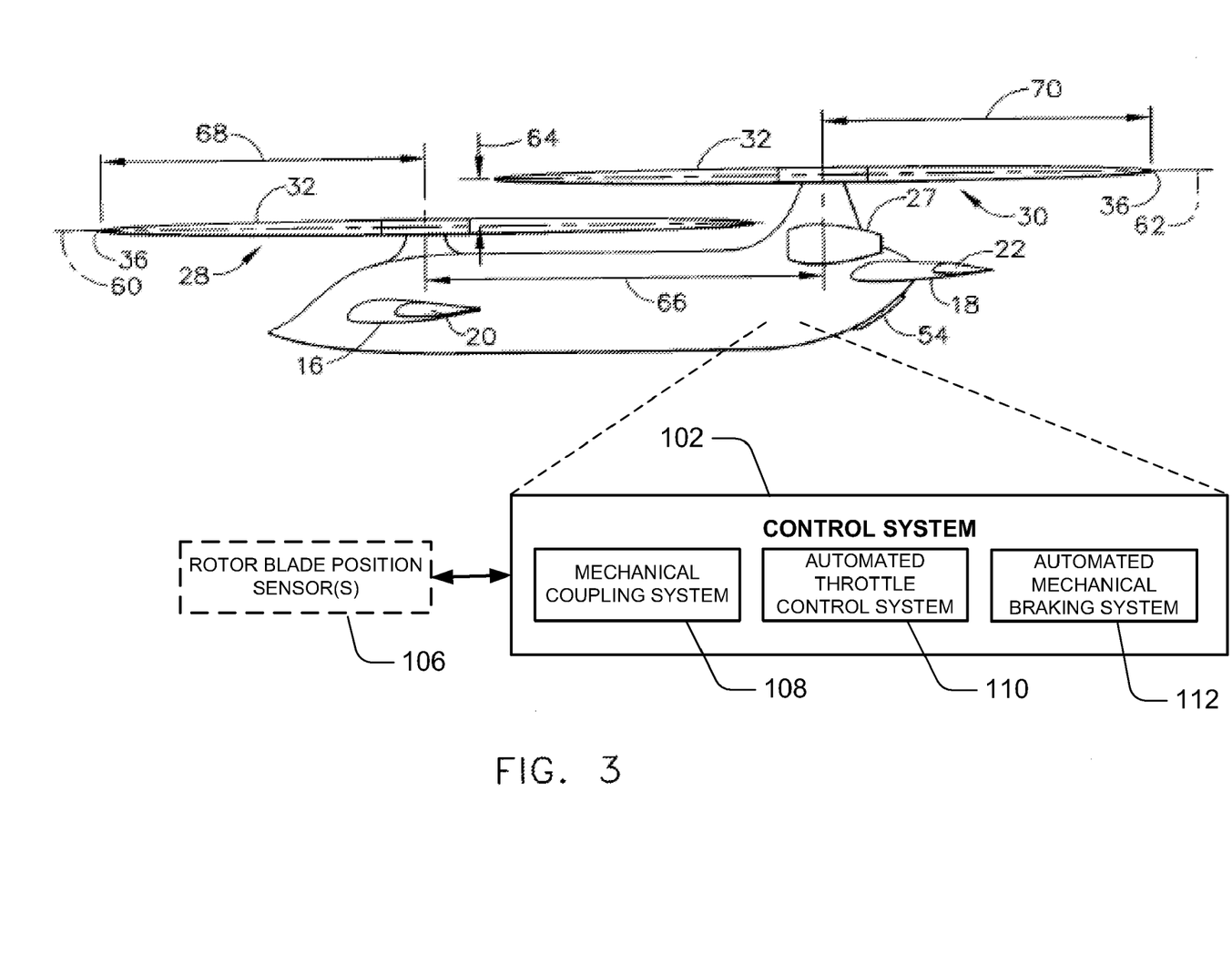
FIG. 3 is a side elevation of the aircraft of the first embodiment.

The aircraft 10 of the present invention is designed to ensure against contact between blades 32. In one embodiment, blade contact is avoided by providing a geometric or physical separation between the blades. FIG. 3 shows an embodiment of the present invention in which the rotor wings 28, 30 rotate in different planes. The first rotor wing 28 rotates in a plane 60 that is above a plane 62 in which the second rotor wing 30 rotates so a predetermined vertical separation distance 64 separates the planes. The separation distance 64 ensures blades of adjacent rotor wings do not contact and is sufficient to compensate for blade deflection, blade pitch changes, and/or rotor tilting. Blades typically deflect or bend within a range of about −2° (i.e., downward) and about 4° (i.e., upward) from the corresponding rotation plane 60, 62. Variable pitch rotor blades typically rotate about their respective radial axes (not shown) between about −10° and about 20°. A tiltable rotor can tilt at its hub 34 about an axis (not shown) that is lateral to the aircraft 10 for providing forward or rearward thrust to the aircraft. Tiltable rotors can typically be tilted by between about 0° and about 8° in both directions. In another embodiment (not shown), the physical separation between blades 32 of respective rotor wings 28, 30 is provided by sufficiently separating the respective rotor wings horizontally so they rotate in a non-overlapping manner. That is, blade contact is prevented by providing an adequate separation distance 66 between hubs and appropriate blades of lengths 68, 70 such that contact between blades of respective rotor wings is not possible.

Another method for avoiding contact between blades 32 of overlapping rotor wings 28, 30 includes having adjacent rotor wings rotate out of phase with each other. That is, even when blades 32 of overlapping rotor wings 28, 30 rotate in or pass though (e.g., by blade deflection) the same horizontal plane, the blades will not contact because no blade will be in an area of potential contact at the same time as another blade. Rotor wings 28, 30 can be kept out of phase from each other by mechanical coupling or rotation speed control. For mechanical coupling, a coupling system 108 (FIG. 3) connects respective rotor wings 28, 30 to each other such that the rotor wings rotate out of phase with each other. One form of mechanical coupling is conventional rigid cross-shafting, in which at least one shaft and a plurality of gears (not shown) link rotor wings 28, 32 such that the rotor wings rotate in a synchronized fashion, that is, with a one-to-one ratio. Thus, an initially set relative phase between respective rotors will be maintained during operation of the rotor wings.

Another method for controlling the relative phase of adjacent rotor wings 28, 30 is by controlling the rotation speed and position of at least one of the rotor wings. Through controlling the rotation speed and position of at least one of each pair of overlapping rotor wings 28, 30, the likelihood of blade 32 contact can be greatly reduced. In one embodiment, rotor wing rotation speed is controlled using a mechanical braking system 112 (FIG. 3). Conventional mechanical braking systems for use with rotors are limited to completely stopping the rotor. The mechanical braking system according to the present invention can include a conventional brake manipulated to allow slowing of the respective rotor wing(s) 28, 30 short of full arrest. For example, instead of having a conventional brake fully clamp against moving parts to stop rotor wing rotation, a closed loop control system can be connected to the brake to allow incremental applications of the break so slight braking is possible. The mechanical braking system may include a carbon brake connected to the rotor wing(s) 28, 30 for slowing rotation of the rotor wing(s) when applied until the desired inter-rotor wing phase relationship is reached.

Figure 4:
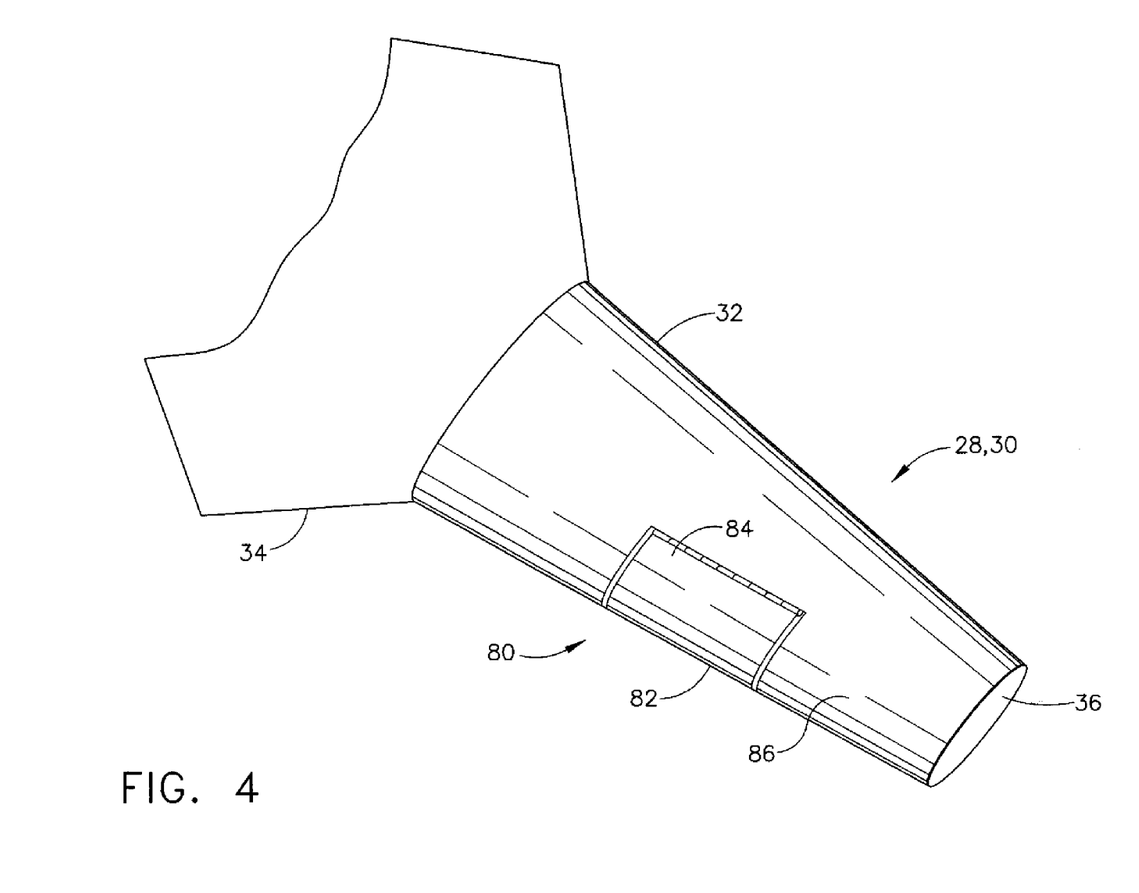
FIG. 4 is a perspective of an aircraft rotor wing according to a second embodiment of the present invention shown with a spoiler in a flush position.
Figure 5:
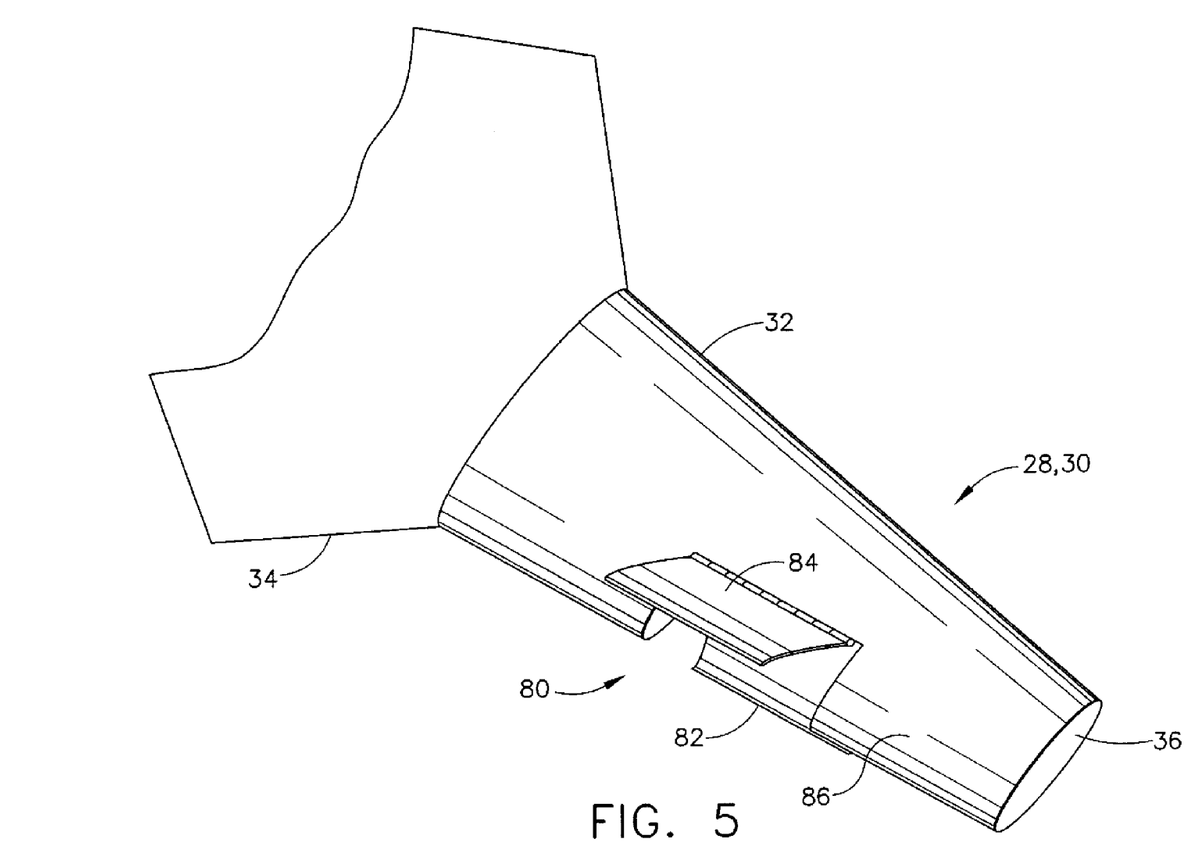
FIG. 5 is a perspective of the second embodiment shown with the spoiler in a fully extended position.

In another embodiment, rotor wing blade speed is controlled using an aerodynamic braking system 80 including at least one spoiler 82 mounted to the blade, as shown in FIG. 4. Although each spoiler 82 can include a single body pivotally connected to one side of the rotor blade 32, in one embodiment each spoiler includes two bodies pivotally connected to opposite sides of the blade, as shown in FIG. 5, to balance the drag effects caused by the spoiler. As will be appreciated by those skilled in the art, the spoiler 82 can be sized, shaped, and positioned on the blade 32 to obtain desired drag characteristics. For example, the spoiler 82 may be positioned at various spanwise locations of the blade (i.e., locations along a radial span of the blade from the central hub 34 to the blade tip 36). The spoiler 82 will generally create a greater drag-induced moment when located at more outboard positions (i.e., closer to the respective blade tip 36) because higher blade speeds and longer moment arms are present at those positions. Spoiler 82 positioning also depends on structural limitations of the blade 32. For example, although more outboard positions are generally desired, in some embodiments, blade 32 structure must be present between the spoiler 82 and the blade tip 36 to satisfy engineering requirements. As another example, a chordwise location (i.e., location along a chord of the blade 32) of the spoiler 82 and a chordwise width of the spoiler may be limited by blade thickness, which may vary along the chord as shown in FIGS. 4 and 5. The spoiler 82 is movable between a substantially flush position, shown in FIG. 4, and a fully extended position, shown in FIG. 5. In the flush position, an exposed active surface 84 of the spoiler 82 is substantially flush with a blade surface 86 and the spoiler creates substantially no drag as the rotor wing 28, 30 is rotated. In the fully extended position, the active surface 84 is angled to a maximum degree with respect to the blade surface 86 and creates maximum drag as the rotor wing 28, 30 is rotated. Although there may be other maximum angles between the spoiler 82 and the blade surface 86 without departing from the scope of the present invention, in one embodiment the maximum angle is between about 80° and about 90°.

In another embodiment, rotor wing rotation speed is controlled using a propulsion control system 110 (FIG. 3). Whether the rotor wings 28, 30 are reaction driven, mechanically driven, or otherwise, the propulsion control system can operate to selectively increase or decrease the speed of at least one of the rotor wings until the desired inter rotor wing phase relationship is reached. For example, in a mechanical drive system, an engine throttle (not shown) can he adjusted to increase/decrease the amount of torque delivered to rotor wings 28, 30 by increasing/decreasing engine 27 speed or changing transmission gears. In a reaction driven system, rotor wing rotation speed can be controlled by adjusting the pressure of gases delivered to the respective rotor wing 28, 30 or by increasing or decreasing the size of one or more exhaust gas exit nozzles (not shown) located adjacent the blade tips 32.

Each speed control system 102 (e.g., mechanical braking, aerodynamic braking, and propulsion control) can be automated using one or more rotor wing 28, 30 position sensors 106 (FIG. 3). The position sensor detects the rotational position of each rotor wing 28, 30 continuously or intermittently. Automated speed control systems can also use speed sensors that detect the rotational speed of each rotor continuously or intermittently. Information acquired by the sensors is sent to a data processor, which is programmed to determine when the rotor wings 28, 30 are rotating outside of a desired phase difference. When the data processor identifies undesired relative phase characteristics, the data processor initiates acceleration or deceleration of at least one of the rotor wings 28, 30 as appropriate to create the desired phase difference.

Although the methods of avoiding inter-blade 32 contact during rotation of the rotor wings 28, 30 are described separately, they may be used in various combinations without departing from the scope of the present invention. For example, a mechanical coupling system may be used on an aircraft design having blades 32 rotating in different planes 60, 62. As another example, blade speeds can be selectively controlled by way of brake and throttle controls.

Figure 6:
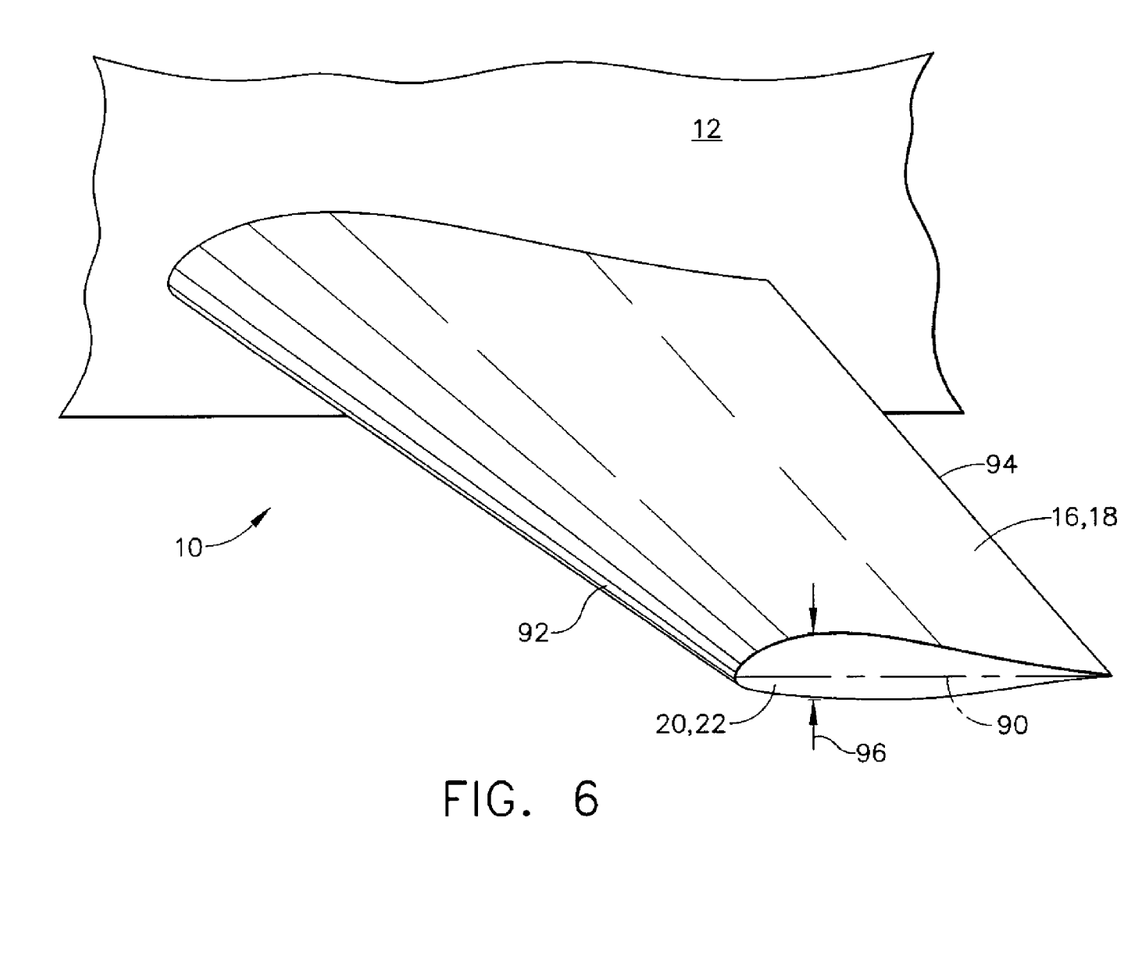
FIG. 6 is a perspective of an aircraft according to a third embodiment of the present invention shown with a fixed wing set in a forward flight position.
Figure 7:
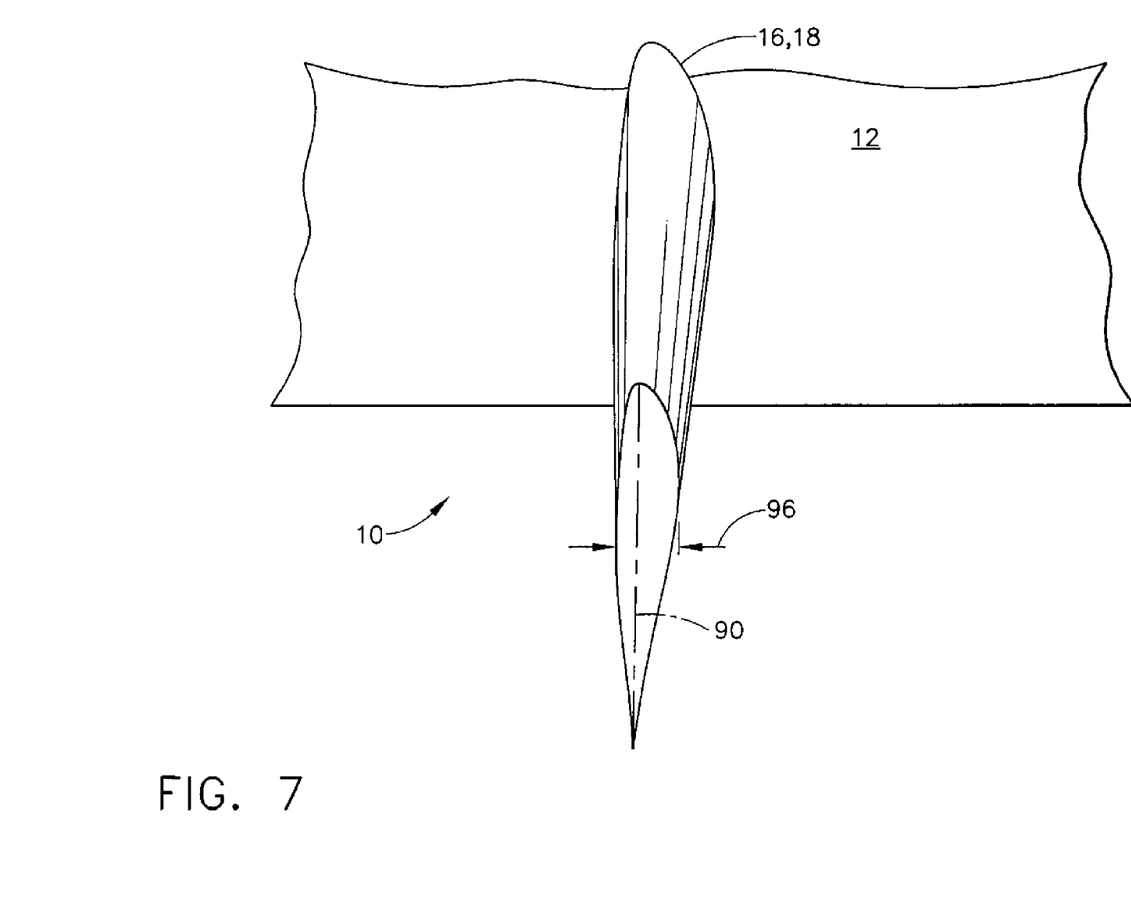
FIG. 7 is a perspective of the third embodiment shown with the fixed wing set in a vertical position.

In an embodiment shown in FIGS. 6 and 7, the fixed wing sets 16, 18 are pivotally mounted on the fuselage. Each fixed wing set 16, 18 has a chord 90 extending between a leading edge 92 and trailing edge 94 of the wing, generally through the center of wing thickness 96. In this embodiment, the fixed wing sets 16, 18 can be selectively moved between a forward flight position, shown in FIG. 6, and a vertical flight position, shown in FIG. 7. In the forward flight position, the chord 90 extends generally horizontally and the fixed wing set 16, 18 is able to provide lift to the aircraft 10 during forward flight. In the vertical flight position, the chord 90 extends generally vertically. The fixed wing sets 16, 18 can be selectively rotated to the vertical flight position to reduce the interference they create with the vertical downwash of the rotor wings 28, 30. The rotor wings provide more vertical thrust to the aircraft when their downwash is less obstructed. The pivot angle of fixed wing sets 16, 18 and rotation speed of rotor wings 28, 30 can be cooperatively adjusted to perform desired flight maneuvers. For example, when a rotor wing 28 adjacent the front end 24 of the fuselage 12 and a rotor wing 30 adjacent the aft end 26 are rotating, the fixed wing sets 16, 18 can be in their vertical flight position because pitch control from the fixed wing sets is not required and the rotor wings provide sufficient pitch control. As another example, when the rotor wings 28, 30 are slowed during transition from vertical flight to forward flight, the fixed wing sets 16, 18 should be moved to their forward flight position because pitch control from the fixed wing sets is increasingly needed as the rotor wings provide less pitch control.

V/STOL aircraft according to the present invention generally allow more reliable heavy lift transport compared to traditional tandem rotor wing aircraft. Further benefits of aircraft according to the present invention over most heavy lift V/STOL aircraft include improved maneuverability and improved payload characteristics.

When introducing elements of the present invention or the preferred embodiment(s) thereof, the articles "a", "an", "the", and "said" are intended to mean that there are one or more of the elements. The terms "comprising", "including", and "having" are intended to be inclusive and mean that there may be additional elements other than the listed elements.

As various changes could be made in the above constructions without departing from the scope of the invention, it is intended that all matter contained in the above description or shown in the accompanying drawings shall be interpreted as illustrative and not in a limiting sense.

What is claimed is:

1. Aircraft comprising:
   an airframe having a fuselage extending longitudinally between a forward end and an aft end opposite said forward end and at least two fixed wing sets extending laterally from the fuselage;
   a power plant mounted on the airframe; and
   at least two rotor wings rotatably mounted on the airframe, each rotor wing including a plurality of blades extending outward from a central hub to blade tips;
   wherein a first fixed wing set of the fixed wing sets is positioned closer to the forward end of the fuselage than a second fixed wing set of the fixed wing sets and the second fixed wing set is positioned closer to the aft end of the fuselage than the first fixed wing set, wherein the fixed wing sets are configured to enable transitioning the aircraft to fixed wing flight by stopping all rotors substantially simultaneously;
   wherein the aircraft has a partial rotation mode in which at least one of the rotor wings is rotated by the power plant while at least one other of the rotor wings is locked to prevent rotation thereof and a fixed mode in which all of the rotor wings are locked to prevent rotation thereof; and
   wherein the blade tips of the rotor wings circumscribe respective circles centered on the corresponding central hubs during rotation of the rotor wings and each fixed wing set is located generally below the circumscribed circle of only one of the rotor wings.

2. Aircraft as set forth in claim 1 wherein each of the fixed wing sets has a chord; and the fixed wing sets are pivotally mounted on the fuselage for selective movement between a forward flight position in which the respective chord extends generally horizontally and a vertical flight position in which the respective chord extends generally vertically.

3. Aircraft as set forth in claim 1 wherein at least one of the rotors rotates at a different speed than another rotor.

4. Aircraft as set forth in claim 1 further comprising a phase control system operatively connected to at least one of the rotor wings for avoiding contact between rotor wing blades of different rotor wings during rotation of the rotor wings; wherein the different rotor wings do not have the phase control system.

5. Aircraft as set forth in claim 4 wherein at least one of the rotors includes a braking system configured for slight breaking of the rotor until a desired inter-rotor wing phase is reached.

6. Aircraft as set forth in claim 4 wherein said control system includes an automated mechanical braking system for controlling a rotation speed of at least one of the rotor wings.

7. Aircraft as set forth in claim 4 wherein the control system includes a propulsion control system operates to selectively increase or decrease the speed of at least one of the rotor wings until the desired inter rotor wing phase relationship is reached.

8. Aircraft as set forth in claim 4 wherein said control system includes at least one spoiler having an active surface positioned on a blade surface of at least one rotor wing blade, said spoiler being movable between a substantially flush position in which the active surface of the spoiler is substantially flush with the blade surface and creates substantially no drag and a fully extended position in which the active surface of the spoiler is angled with respect to the blade surface and creates maximum drag.

* * * * *